June 13, 1944.  T. OBSZARNY  2,351,451

PRESELECTOR

Filed Aug. 9, 1943  4 Sheets-Sheet 1

INVENTOR.
Thedore Obszarny,
BY
Bair & Freeman
Attys.

June 13, 1944. T. OBSZARNY 2,351,451
PRESELECTOR
Filed Aug. 9, 1943 4 Sheets-Sheet 2
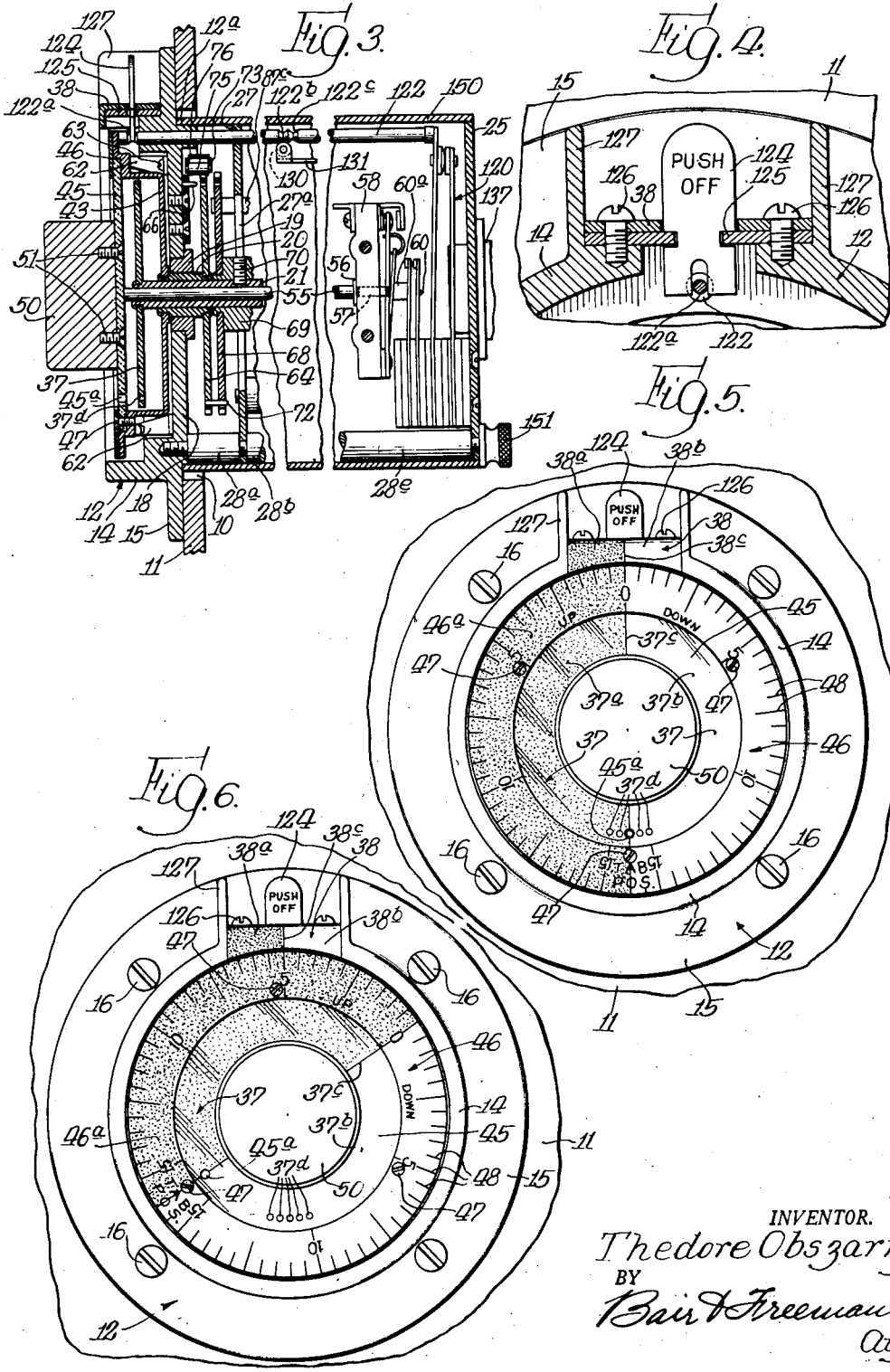
INVENTOR.
Theodore Obszarny,
BY
Bair & Freeman
Atty.

June 13, 1944. T. OBSZARNY 2,351,451
PRESELECTOR
Filed Aug. 9, 1943 4 Sheets-Sheet 4

INVENTOR.
Theodore Obszarny.
BY
Bair & Freeman
attys.

Patented June 13, 1944

2,351,451

UNITED STATES PATENT OFFICE 2,351,451

PRESELECTOR

Thedore Obszarny, Chicago, Ill., assignor to Guardian Electric Manufacturing Co., Chicago, Ill., a corporation of Illinois Application August 9, 1943, Serial No. 497,951

14 Claims. (Cl. 172—239)

The present invention relates to improvements in control devices of the type for controlling the operation, either in terms of time or amount of movement, of various electrically operated apparatus.

More particularly, the present invention relates to control devices of the type adapted to be pre-adjusted to a desired position, for effecting movement, through the medium of an electric motor, of the apparatus to be controlled, to a corresponding position, within its range of movement. The control device, because of its nature may for convenience be termed a "preselector," and is adapted to be utilized in connection with apparatus to be moved in a rotary path, or a linear path, that is either vertically, horizontally, or in an inclined path, or any other path of movement.

The control preferably comprises a two-direction stepper mechanism, including a stepper gear adapted to be moved in step-by-step manner, in opposite directions, by separate electromagnets, operable by pulsations of electric current, together with rotatable selective adjustment means, which is normally locked against rotative movement, but may be released for such rotative movement upon a limited amount of axial movement. The adjustment means includes a selector gear, and means is provided for interconnecting the selector gear and stepper gear incident to such axial movement of the selective adjustment means, so that rotative adjustment of said adjustment means imparts similar rotative adjustment of the selector gear. The position of adjustment of the adjusting means corresponds to the position assumed or to be assumed by the apparatus to be controlled.

Controls of this general class permit obtaining relatively accurate and expeditious adjustment of apparatus to be controlled for causing said apparatus to assume a predetermined position within its permissible range of movement, such as for example the trim tabs of an airplane, pointing, indexing or adjustment of guns, instruments, machines and parts thereof, and various other types of apparatus which are movably adjusted to a predetermined position within a permissible range of movement. The control device and apparatus to be controlled may be located in close proximity to each other or may be located remotely with respect to each other. Controls of this type desirably are provided with suitable indicia so as to visibly indicate the position of adjustment assumed or to be assumed by the apparatus to be controlled.

The present invention represents certain novel and important improvements in preselector devices of the type disclosed in my co-pending application, Serial No. 480,045, filed March 22, 1943.

One of the objects of the present invention is to provide in a preselector of the character indicated, improved indexing means by virtue of which the stepper gear and the selective adjustment means are maintained in an exact corelationship, which in turn insures positioning of the apparatus to be controlled in exact correspondence to the position of adjustment of the selective adjustment means.

Another object is to provide in a preselector of the character indicated, improved means for limiting rotative movement of the adjusting means and the stepper gear, in either direction from a zero starting position, so as not to exceed an angular range of movement in excess of 180° during any single adjusting operation of the adjustment means.

A further object is to provide in a preselector of the character indicated, improved control means for a main switch of the control circuit, wherein separate, manually-operable means for actuating the switch is provided, together with constructional arrangements by virtue of which inward axial movement of the adjustment means insures that the main switch be disposed in closed position, irrespective of the position previously assumed by said switch as a result of actuation of the manually operable means.

Still another object is to provide in a preselector of the character indicated, novel electrical control means for insuring maintenance of exact corelationship of the apparatus to be controlled with the selective adjusting means, by virtue of which the adjusting means will at all times be disposed in a position of adjustment corresponding to the position assumed or to be assumed by the apparatus being controlled.

Other objects and advantages of this invention will be apparent from the following description, taken in connection with the accompanying drawings, in which:

Figure 3 is a fragmentary, vertical, axial sectional view of the preselector, with parts disposed in a position as assumed in process of adjustment of the device;

Figure 4 is a detail, sectional view through the upper forward portion of the main housing member, showing the mounting arrangement of the main switch operating member, taken as indicated at line 4—4 on Figure 2;

Figure 5 is a front elevational view of the preselector device in a zero or neutral position of adjustment.

Figure 6 is a front, elevational view similar to Figure 5, but showing the adjusting means and associated parts in an adjusted position, preparatory to causing operation of the stepper mechanism and the apparatus to be controlled;

Figure 1:
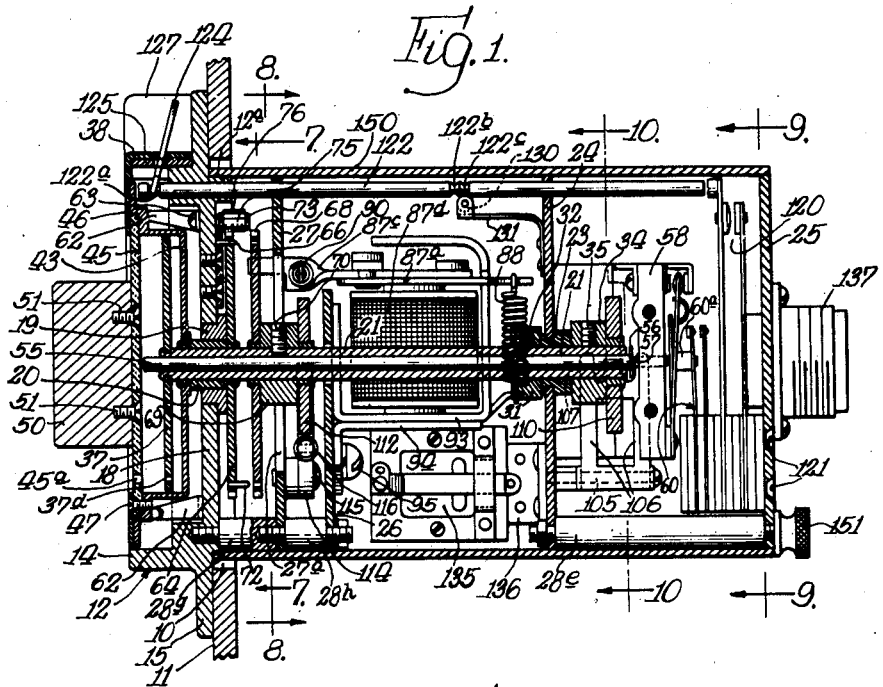
Figure 1 is a vertical, axial section through my improved preselector device.

The preselector device embodying the present invention is in the form of a compact unitary instrumentality, constructed and arranged for convenient mounting, such as herein shown, through an aperture indicated at 10, in a mounting panel 11. The entire device is totally supported upon the panel by a main frame member in the form of a cast, annular head 12, including a forwardly extending annular flange 14, and a transverse flange 15 adapted to seat against the outer face of the panel 11, and secured in position thereon by suitable fastening means, herein indicated as bolts, designated at 16. The forward or horizontal flange 14 and the transverse flange 15 of the main frame member constitute an escutcheon plate or bezel ring for dial apparatus, to be hereinafter described.

The main frame member includes a transverse web 18, formed as an integral part of the flanges 14 and 15, in the center of which is press-fitted an annular plug 19, constituting a bearing for an axially movable hub 20, which in turn provides journal support for an axially and centrally located, longitudinally extending tubular shaft 21, the rear end of which shaft is journaled in a shouldered bearing member 23, press-fitted in a mounting plate 24, in the form of a circular disc, and which constitutes a part of the main frame structure.

Figure 8:
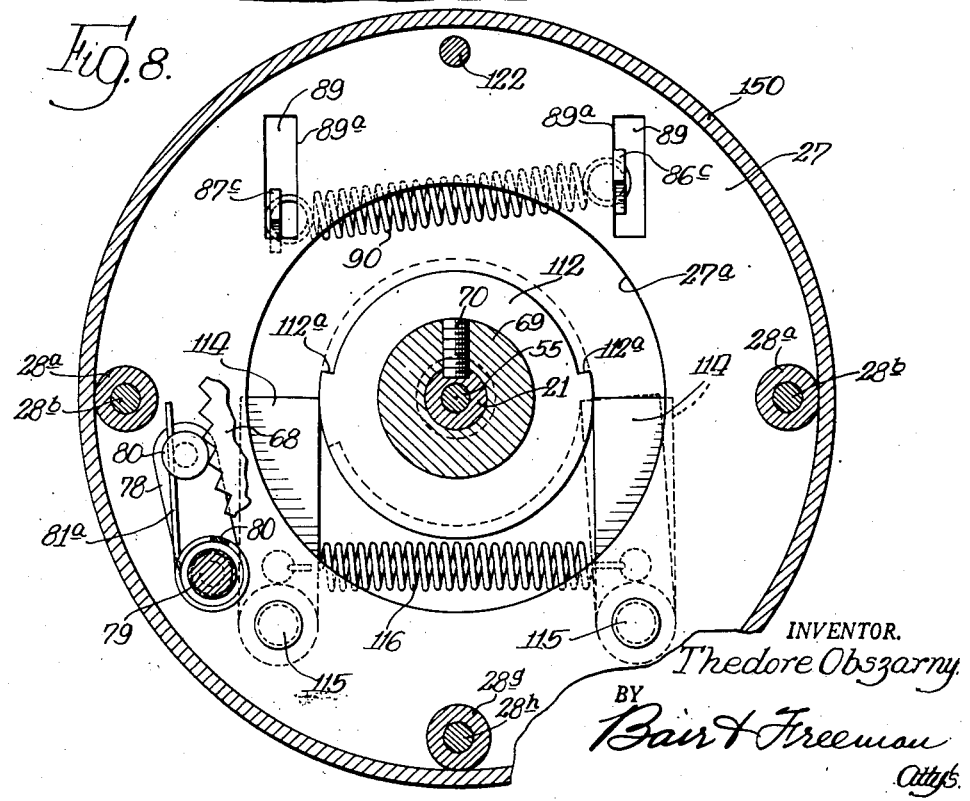
Figure 8 is an enlarged, transverse, sectional view taken as indicated at line 8—8 on Figure 1, showing the novel stop means by virtue of which the device is precluded from being adjusted, during a single operation, in either direction from the zero starting position to an angular position in excess of 180°.

Rigidly connected to the main frame member 12 and forming a part of the framing structure, in addition to the plate 24, is an outer end mounting plate 25, an intermediate mounting plate 26, and a forward end mounting plate 27. The intermediate mounting plate 26 is of segmental circular contour, whereas the respective end mounting plates 25 and 27 are of circular contour. The forward end plate 27 is provided with a large central opening 27a, as seen in Figure 8. The four plates 24, 25, 26 and 27 are rigidly secured together and to the main frame member 12 by two sets of interconnecting stud members, indicated generally at 28, at opposite sides of the assembly, each comprising cooperating threaded members 28a, 28b, 28c and 28d. At the lower portion of the assembly, the plates 24 and 25 are interconnected by a spacer stud 28e and the mounting plates 26 and 27 are interconnected with the main frame member by cooperating studs 28g and 28h. Thus the mounting plates and the main frame member 12 are rigidly connected together as a unitary framing structure.

The tubular shaft 21 is supported in the framing structure and confined against axial movement in one direction by means of a collar 31, secured in place by a set screw 32, with the collar abutting against the adjacent forward end of the bearing member 23, mounted in the frame plate 24. Mounted adjacent the outer end of the tubular shaft is a shouldered collar 34, disposed in abutting relation to the opposite end of the shouldered bearing 23, and fixedly secured in position thereon by a set screw 35 for precluding axial movement of said tubular shaft in the opposite direction.

Rigidly mounted on the extreme forward end of the tubular shaft 21 is a position disc 37, the outer face of which is divided into two identical semi-circular areas, preferably of contrasting color. The area indicated by stippling at 37a, may for example be white, as contrasted with the other semi-circular area 37b, which may be of a color other than white, such as black. The normally upper line of juncture between the two contrasting color areas, as indicated at 37c constitutes an index mark, as may be clearly seen in Figures 5 and 6. The purpose of the index mark is to visually indicate the position of adjustment of the stepper mechanism at any time, and which will likewise indicate the position of the apparatus being adjusted. The index mark 37c is normally in a zero starting position, disposed in registration with a corresponding index mark 38c formed on a plate 38 rigidly secured in position on the forwardly extending flange 14 of the main frame member 12. The index mark 38c is likewise formed as a result of contrasting color areas of two opposite portions of the plate 38. The area indicated at 38a, on the same side of the vertical center of the apparatus, in the initial or zero position of adjustment, corresponding to the area 37a of the position disc, is similarly stippled to indicate the color white, and the other area 38b preferably corresponds in color to the area 37b of the disc.

After the control device has been adjusted to a preselected position for effecting a corresponding proportional amount of movement of the apparatus to be controlled, the indicating mark 37c of the position disc 37, is then disposed in an angular position of adjustment with respect to the index mark 38c, as seen in Figure 6, and by stepping mechanism to be hereinafter described, the disc 37 returns to a zero starting position, with its index mark 37c in registration with the fixed index mark 38c, as seen in Figure 5 of the drawings.

Rigidly secured to the forward end portion of the hub 20, and rotatably movable therewith, is a dial frame 43, of flattened cup-shaped formation, disposed in surrounding relation to the position disc 37. The inner marginal portion of the flange of the dial frame is formed with an offset to provide a seat for a transparent panel 45, preferably of plastic material, which is held in fixed relation to the dial frame member by a dial ring 46, through the medium of screws 47. The dial ring, as clearly seen in the drawings, is graduated as indicated at 48, and is provided with a zero indication which is initially disposed in registration with the index mark 38c on the main frame member and the index mark 37c of the position dial.

It will be noted that the dial ring is graduated in opposite directions from a zero indication, and has thereon on one side (as shown, the left side), the word "Up" and on the opposite side, the word "Down," so as to clearly indicate visually the position and/or the direction of adjustment of the apparatus to be controlled. Other suitable terms may be employed to indicate the direction of movement of the apparatus to be controlled, such as "Forward" and "Backward" and "Left" and "Right." The terms herein used are to indicate either up or down movement, in a predetermined range of movement of the apparatus being controlled. The graduations on the dial ring 46 correspond to and represent degrees of movement up or down of the apparatus being controlled, and do not represent in degrees the angular movement of the adjusting means. Any other suitable form of graduations may be employed to correspond with and designate the particular characteristics of movement of the apparatus being controlled.

The left half of the graduated dial as indicated by the stippling at 46a is preferably colored in correspondence with the area 37a of the selector disc, and the area 38a of the plate 38, on the main frame member, so that in the zero starting position of the adjustment of the assembly, the left half of the assembly, including position disc 37, dial ring 46 and the plate 38, is of contrasting color with the right half, and when the dial ring 46 is rotated, its position of adjustment may be immediately observed by the visual color contrast, in addition to the indications of the graduations thereof, with respect to the index mark 38c on the main frame member.

In the construction illustrated, the dial ring and associated parts are adapted to be rotated in either direction, through an arc of slightly less than 180°, from the zero starting position of adjustment. Suitable stop means may be provided for arresting rotation of the dial ring and associated parts to any lesser amount of movement as may be desired.

Rigidly secured centrally of and extending forwardly from the transparent panel 45 is a main adjusting finger knob 50, which is rigidly secured in position with respect to the panel by means of screws 51. Thus the dial ring and associated parts may be conveniently adjusted by means of the knob 50.

Mounted within the tubular shaft 21 is a switch actuating shaft 55, the forward end of which terminates in close proximity to the inner surface of the panel 45, as seen in Figure 1. The opposite end of the shaft is provided with an abutment head 56, adapted to engage a spring-pressed plunger 57 of a conventional snap-action switch indicated generally at 58, which switch is connected in an electrical circuit of the apparatus to be controlled, which, it is to be understood, includes an electric motor and cooperating apparatus, operable by the motor for adjustment by the control device. The switch 58 is supported on the axial center of the assembly by means of a pair of laterally extending brackets 59. Disposed rearwardly of the snap switch 58, in central alignment therewith is a stack switch 60, including an abutment 60a, cooperating with and movable by the initially movable member of the snap switch 58.

The knob and dial assembly, by means as hereinafter described, are normally held against rotative movement, in a position of adjustment as seen in Figure 1 of the drawings. Said knob and assembly must first be axially shifted inwardly, as seen in Figure 3 of the drawings, at which position the knob and dial assembly may then be rotated to a preselected position of adjustment. Such axial movement of the knob and dial assembly results in imparting rearward movement to the inner shaft 55, which, in turn, actuates the snap switch 58, and the latter actuates the switch 60 to a closed position. When the knob and dial assembly move outwardly to the normal position, as seen in Figure 1, the spring action of the snap switch 58 returns the shaft 55 to the position seen in Figure 1 of the drawings, which restores the snap switch 58 to its original position of adjustment, and effecting opening of the switch 60.

The knob and dial assembly is normally urged outwardly to the position seen in Figure 1 of the drawings by three circumferentially spaced-apart arcuate spring fingers 62, secured by screws 63, to the forward face of the web 18 of the main frame member 12, and the outer or free ends of the springs react against the rear face of the flange of the dial frame member 43. The knob and dial assembly is limited at its outer position, as seen in Figure 1 of the drawings, by a selector gear 64, which is rigidly connected to the rear end of the hub 20, and is adapted in one axial position of adjustment to abut against the rear face of the plug 19, and thereby limits the forward movement of the knob and dial assembly. By virtue of the rigid connection of the selector gear 64 to the hub 20, said gear is adapted to be moved and rotated with the knob and dial assembly as a unit.

Figure 7:
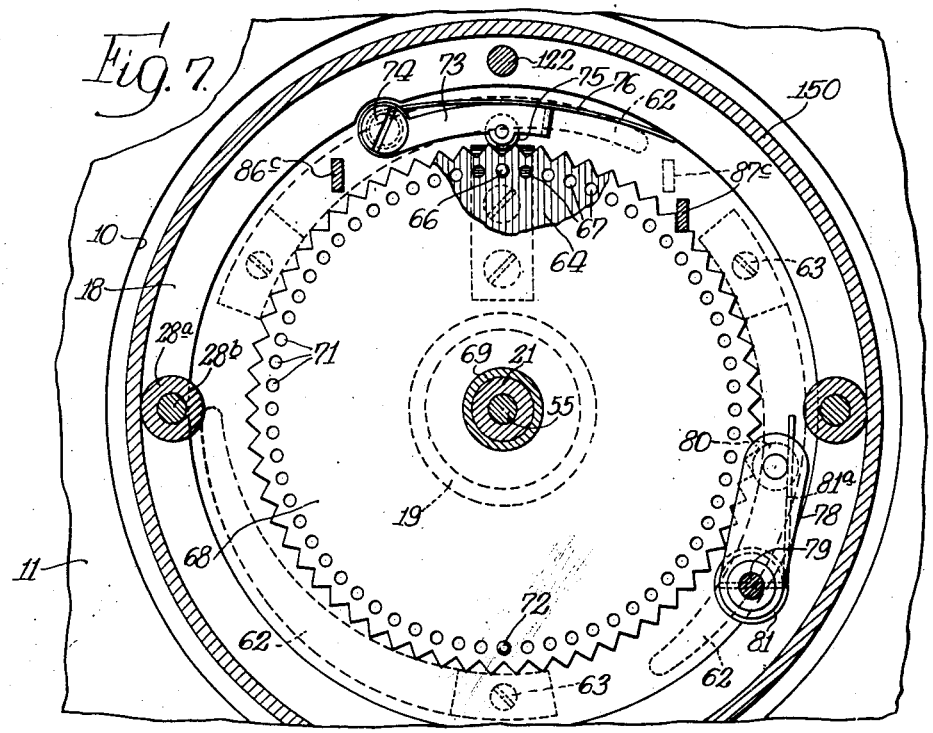
Figure 7 is an enlarged, transverse, sectional view, taken as indicated at line 7—7 on Figure 1, showing the relationship of the stepper gear and selector gear.

In the position of adjustment of the knob and dial assembly, including the selector gear, as seen in Figure 1 of the drawings, said selector gear is disposed in inter-meshed, locking relation with an indexing pin 66, extending rearwardly from the web 18 of the main frame member 12. In such position the pin is projected into one of a circular series of holes 67, formed in said selector gear, as seen in Figure 7. Thus, when the knob and dial assembly is shifted axially from the position seen in Figure 1 to the position seen in Figure 3 of the drawings, the pin 66 is disengaged from the gear 64, so that said gear, together with the knob and dial assembly, is free to be rotated, in either direction, from the zero starting position of adjustment of the assembly, and when pressure is relieved on the outer end of the knob 50, the assembly moves outwardly under the influence of the spring fingers 62 to the position seen in Figure 1 of the drawings, at which position the pin 66 indexes with and projects into an aligned hole 67 of the selector gear, for locking the assembly in the angular or rotated position of adjustment.

Rigidly secured on the tubular shaft 21, rearwardly with respect to the selector gear 64, and in close spaced-apart relation thereto, is a stepper gear 68, which is rigidly mounted on a hub member 69, which in turn is fixedly secured by means of a set screw 70 to the tubular shaft 21.

The stepper gear 68 is provided with an identical circular series of holes 71. An indexing pin 72 is fixedly secured in one of the holes of the selector gear 64, and extends rearwardly therefrom, for engaging in an aligned hole 71 of the stepper gear 68, incident to such axial movement of the knob and dial assembly, so that when the knob and dial assembly are thus moved, and then rotated in either direction from the zero starting position, said gears are rotated as a unit in correspondence with the knob and dial assembly. When the knob and dial assembly is then released and returned to the outward position of adjustment, the pin 72 of the selector gear is disengaged from an aligned hole of the stepper gear, thus permitting the stepper gear to remain temporarily in such angular position of rotative adjustment.

The selector gear and stepper gear are for all practical purposes substantially identical as to size, teeth formation and size and location of their respective series of holes. The teeth of these gears are formed sharply pointed by widemouthed notches to insure exact indexing of the gears with respect to each other and with respect to the zero or starting position of adjustment of the assembly. These gears are provided with individual roller detents and, as seen in Figure 7 of the drawings, the detent for the selector gear includes a bail member 73, pivotally mounted on a stud 74, connected to the rear face of the web 18 of frame member 12. A roller 75 is journaled on the outer end of the bail member and the bail member is resiliently urged in the direction of the selector gear by means of a leaf spring 76, so as to yieldingly cause the roller to seat in one of the notches of the gear. The yielding detent for the stepper gear includes an arm 78 carried on a pin 79, connected to the frame plate 27. The outer end of the arm is provided with a roller 80 adapted to seat in a notch of the stepper gear, and the roller is urged into yielding engagement with said notches by means of a coil spring 81, anchored to and wound around the pin 79 with a free leg 81a thereof positioned as seen in Figure 7 of the drawings.

By virtue of the sharp pointed teeth of the respective selector and stepper gears, and the roller form of detents for said gears, said gears will at all times be exactly indexed with respect to each other as well as the zero starting position of adjustment as identified by the indicating mark 38c on the plate 38 carried by the main frame member. Due to the pointed form of teeth, the rollers of the respective detents cannot be arrested thereon, and thus possible misalignment of the selector and stepper gears is eliminated. It can be readily appreciated, in view of the following description, that it is of extreme importance to maintain exact indexing relationship between the two gears in order that the position of adjustment of the knob and dial assembly will truly and exactly indicate the position of adjustment assumed or to be assumed by the apparatus to be controlled.

To facilitate the alignment and indexing relationship of the gears during assembly, or in the event that due to some condition said gears become out of indexed relation, I provide a series of apertures 37d in the position disc 37, in diametrically opposite relation to the index mark 37c, and I also provide an aperture 45a in the lower portion of the transparent panel 45, disposed in diametrically opposite relation to the zero graduation of the dial 46, so that a suitable small instrument may be inserted through the aperture 45a into one of the apertures 37d of the selector disc to rotatably shift the disc and stepper gear 68, in either direction, a slight amount, to obtain or restore the indexed relationship between said stepper gear and the selector gear.

The stepper gear is adapted to be initially moved with the dial and knob assembly, as above described, in a rotary direction to a desired angular position corresponding to a proportionate amount of movement to be imparted to the apparatus being controlled, and when the stepper gear is disengaged from the knob and dial assembly, it is caused to be returned to a zero starting position by stepping mechanism, comprising a pair of electromagnets 86 and 87, having armatures 86a and 87a respectively, hinged at their rear ends, and normally urged to an upper deenergized position by means of coil springs 88. Pivotally mounted at 86b and 87b on the respective armatures, are longitudinally extending actuator arms or stepping fingers 86c and 87c respectively.

The forward portions of these stepping fingers project through apertures 89 formed in the mounting plate 27 and are normally disposed in a position adapted when the respective electromagnets are energized to engage opposite peripheral portions of the toothed stepper gear 68. It is to be understood that the electromagnets are separately actuated by pulsation of electric current, depending upon the direction of rotative adjustment of the dial and knob assembly. When one of the electro-magnets is operated, the stepper gear is rotated in one direction in step-by-step fashion to its zero starting position, and when the other electromagnet is operated, the stepper gear is rotated in an opposite direction in step-by-step fashion, to the zero starting position.

When the stepper gear is being stepped to the zero starting position, control circuits to the apparatus to be controlled are completed for a period of time to effect corresponding adjustment of said apparatus within its predetermined range of movement. When either of the electromagnets are so energized, their stepper fingers move downwardly into engagement with the teeth of the stepper gear 68, and for each downward movement of the armature of the magnet, the gear is stepped an angular amount equivalent to the spacing of a tooth.

The purpose of providing a pivotal mounting for the stepper fingers of the respective magnets is to permit lateral movement of the fingers to insure a proper following action of the fingers with respect to the gear teeth for maintaining a proper driving engagement with the teeth of the gear, as the gear is rotated in such step-by-step fashion. To insure proper relationship of the fingers with respect to the stepper gear, the guide surfaces 89a of the respective apertures 89 in the plate 27 serve as stops for properly positioning the stepper fingers for initial engagement and registration with the teeth of the stepper gear, and a coil spring 90, interconnects the outer ends of said fingers to yieldingly urge them against the stop guide surfaces 89a.

The electromagnets each include field pieces 93 carrying coils 86d and 87d respectively, said field pieces are rigidly secured to mounting brackets 94, fixedly secured by screws 95 to the rear face of the intermediate segmental frame plate 26. As may be noted in Figure 2 of the drawings, the electromagnets are supported in symmetrical relation with respect to the vertical axis of the assembly on opposite sides of the shafts 21 and 55.

Figure 2:
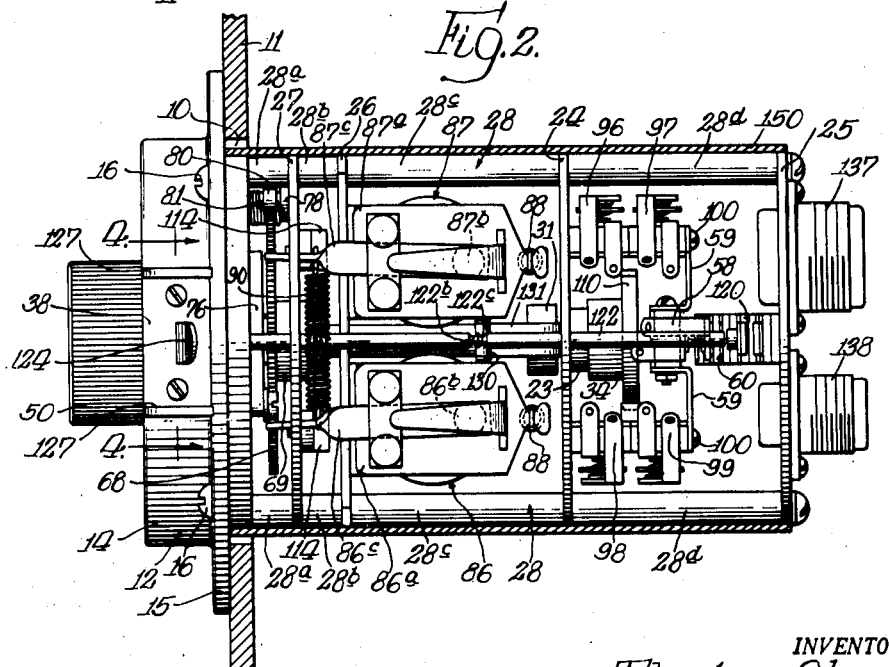
Figure 2 is a top, elevational view of the device, with a portion of the cylindrical housing broken away to show the relationship of parts.
Figure 9:
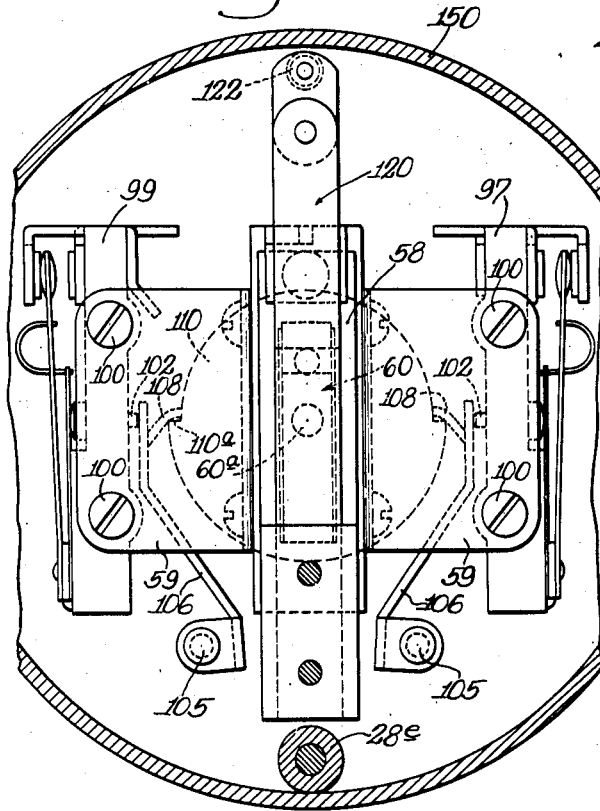
Figure 9 is an enlarged, transverse, sectional view through the rear end of the device, taken as indicated at line 9—9 on Figure 1, showing parts of the switching arrangement.

Mounted at the rear or outer end of the assembly, intermediate the mounting plates 24 and 25, are dual sets or pairs of snap action switches, disposed in transversely spaced-apart relation to each other as seen in Figures 2 and 9 of the drawings. These switches are of conventional form and may be identified by reference characters 96 and 97 for one set, and by reference characters 98 and 99 for the other set. These sets of switches are rigidly secured to the mounting plate 24 by means of stud bolts 100, which stud bolts also secure the mounting brackets 59 in position, to support the single snap action switch 58. While I have herein shown a certain commercial type of snap action switch, it is to be understood that various other types of switches of an equivalent character may be utilized. Each of these switches include a spring-pressed plunger 102, adapted to be engaged by pressure applying elements for shifting the switch mechanism from one position of adjustment to another.

Mounted on pivot pins 105, connected to the mounting plate 24, on opposite sides of and below the shafts 21 and 55, as seen in Figure 9 of the drawings, are dual switch actuating members 106, each of which include a pair of spaced-apart operating fingers 107, having their upper ends located respectively in registration with the plunger members 102 of two adjacent snap switches of a respective set. The upper end of each switch actuator, intermediate the pair of fingers, is provided with an inwardly projecting cam actuated lug 108. It is to be understood that normally the snap action switches 96, 97, 98 and 99 are in, what for convenience, may be termed an open position, so that the spring pressure thereof reacts through the plungers 102 and tends to urge the switch actuating members 106 inwardly, as seen in Figure 9 of the drawings, and in which position, the lugs 108 of the actuating members are disposed in the path of travel of a pair of diametrically opposite abutment shoulders 110a of a control cam 110. The control cam is rigidly secured on a reduced hub portion formed on the rear end of the collar 34 as seen in Figure 1 of the drawings.

Figure 10:
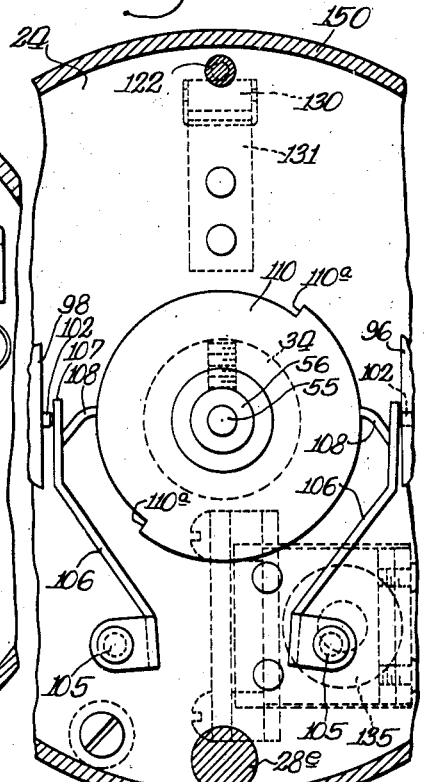
Figure 10 is a fragmentary, enlarged, transverse, sectional view, taken as indicated at line 10—10 on Figure 1, showing the position of certain of the switch operating members, during operation of the stepper mechanism.

As may be noted from Figures 9 and 10 of the drawings, the cam member 110 has approximately one-half of the periphery thereof formed of a uniform diameter, and the other half of the periphery is also of a uniform but larger diameter, and the two peripheral portions are connected by the pair of diametrically opposite abutment shoulders 110a above referred to.

As above stated, the knob and dial assembly may be rotated in either direction an angular amount slightly less than 180°. Therefore, if the knob and dial assembly are first rotatably adjusted to one maximum limit, and the stepper gear is returned to a homing position, said assembly may be reversed in the direction of rotation beyond the zero starting position to the other limiting position of adjustment. To rotate the assembly to the other maximum limit position necessitates another adjustment of the knob and dial assembly after the stepper gear is returned to a zero starting position. In order to relieve the parts of the mechanism of strain when the assembly has been rotated to either of its limiting positions of adjustment, I provide novel stop means in the form of a disc 112 mounted on a reduced rearward extension of the hub 69. The disc is formed with a reduced peripheral portion of slightly less than 180° angular extent, which is connected by a pair of transverse shoulders 112, to an enlarged peripheral portion as clearly seen in Figure 8 of the drawings. These stop shoulders 112a are located in angular relation to each other to correspond with the two graduations identified as number "15" on opposite portions 46a and 46b of the graduated dial 46, as will presently appear. Cooperating with the disc 112 is a pair of transversely spaced apart upstanding stop members 114, pivotally mounted at their lower ends on pins 115 connected to the rearward side of the mounting plate 27. The stop members are interconnected by a coil spring 116 to urge their upper operating ends into yielding engagement with the periphery of the disc 112.

It is to be understood that the position of the disc 112, as seen in Figure 8 of the drawings, corresponds to a zero starting or homing position of adjustment of the stepper gear 68. Since this disc is rigidly connected with the stepper gear, it will be apparent that the stepper gear cannot at any one time during process of adjustment by means of the knob and dial assembly, when the gear is in a homing position, be rotated through an angular range in excess of 180°, but as above stated, will be slightly less than this amount of rotative movement. Thus, for example, if the knob and dial assembly are initially rotated in clockwise direction from the zero starting position, the left-hand stop shoulder 112a as seen in Figure 8 of the drawings, will abut against the end of the right-hand stop member 114, and similar stopping action occurs by the opposite shoulder and stop member when the knob and dial assembly are rotated in counter-clockwise direction. By virtue of this construction, all strain incident to adjustment of the mechanism to the maximum positions, in either direction, is relieved from other parts of the control mechanism.

A main switch designated at 120, in the form of a switch stack assembly is connected in assembled relation to the switch 60, to the rear frame plate 25, by means of screws 121. This main switch, which, as seen in Figure 1 of the drawings, is in open position is adapted to be actuated by the rear end of a longitudinally extending plunger rod 122, journaled in the mounting plates 24 and 27 as well as in the main frame member 12. The rear end of the plunger rod is positioned to engage the movable switch member of the switch 120, and the extreme forward end of the rod is reduced in cross section, as indicated at 122a, and which reduced portion is engaged by a yoke formed in the lower end of a finger operated lever 124, with the upper end of the lever disposed exteriorly of the main frame member, in position for convenient manual operation. The lever 124 is fulcrumed in a plate 125, which together with the index plate 38 is rigidly secured in position on the flange 14 of frame member 12 by screws 126. The plate 38 is of angular cross section as seen in Figure 1 of the drawings.

The main frame member 12 is provided with a pair of upstanding ears 127, at opposite sides of the projecting portion of the lever 124, so as to serve as guards to prevent inadvertent engagement of the lever 124. The extreme forward end of the push rod 122 terminates in close proximity to the rear side of the marginal flange of the cup-shaped dial frame member 43, as seen in Figure 1 of the drawings. The rod is formed intermediate its length with a pair of closely spaced apart annular grooves 122b and 122c adapted to be selectively engaged with a spring roller detent, comprising a roller member 130, journaled on a spring mounting bracket 131, which in turn is riveted to the frame mounting plate 24. The spring bracket member yieldingly urges the roller 130 in an upward direction into resilient engagement with the notches of the rod, and tends to maintain the rod in either of two longitudinal positions of adjustment.

When the lever 124 is in the position seen in Figure 1 of the drawings, it is releasably secured in such position by the spring roller detent, and the main switch 120 is disposed in open position. To close the main switch, the lever 124 is pulled forwardly, so as to cause the rod 122 to be shifted rearwardly to seat its groove 122b in registration with the spring-pressed roller 130, in which position of the rod, the main switch 120 is in closed position.

It will be apparent that even when the lever 124 is in the "off" position, as seen in Figure 1 of the drawings, axial movement of the knob and dial assembly, preparatory to rotative adjustment for effecting corresponding movement of the remotely located apparatus to be controlled, such axial movement will cause the flange of the dial frame member 43 to engage the forward end of the rod 122, and shift it rearwardly for effecting closure of the main switch 120, and the rod will be releasably secured in such position by the spring detent until disengaged by pushing the lever 124 rearwardly to the position seen in Figure 1 of the drawings.

Thus if it is desired to instantly effect adjustment of the control mechanism, no thought need be given to the operation of the main switch, because if said switch is not in closed position, it will automatically be closed incident to the operation of adjustment of the device. The entire apparatus, however, may be rendered inoperative, when it is no longer desired to use the same, by pushing the lever 124 rearwardly to the position seen in Figure 1 of the drawings, so as to open the main switch 120.

To insure maintaining exact synchronized relation between the apparatus being controlled and the preselector device, I provide novel electrically actuated means comprising a relay 135, supported by a mounting bracket 136 on the intermediate mounting plate 24 of the frame structure. This relay is connected in the electrical control circuit as will be presently described.

The conductor wires which connect the contacts of the respective switches, the electromagnets and relay are for convenience not shown in the drawings, but may be understood to be connected to suitable contacts located in coupler members of detachably connectible circuit making and breaking devices, indicated generally at 137 and 138, connected to the rear mounting plate 25. It is to be understood that these coupler members are adapted to be engaged by cooperating members of multiple cable connector devices, which in turn complete electrical circuits through a source of power and to an electric motor indicated at 140 in the wiring diagram of Figure 11, which it may be understood, serves to actuate or move the apparatus to be controlled.

The entire mechanism of the control device, rearwardly of the main frame member 12, is adapted to be enclosed in a cylindrical sleeve 150 of any suitable material, dimensioned for a snug, telescopic fit over the circular contour of the mounting plates, with the forward end of the cylinder snugly telescoped over a circular flange 12a, at the rear side of the main frame member 12. The sleeve may be detachably secured in assembled position by means of a thumb screw 151 threaded into the rear mounting plate 25, with the shoulder thereof positioned to overlie the rear end of the sleeve, as clearly seen in Figure 1 of the drawings.

Figure 11:
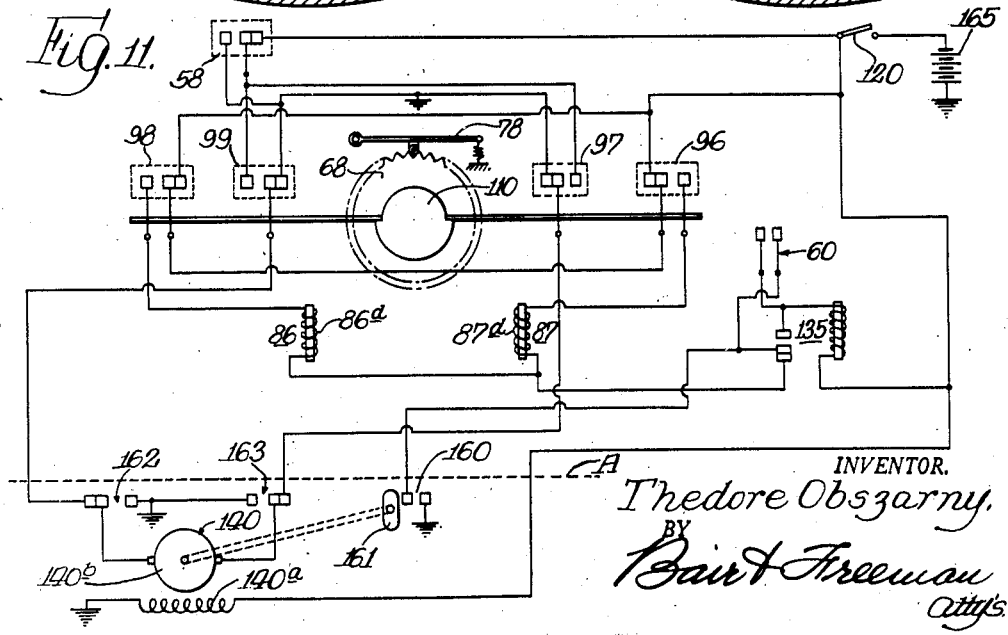
Figure 11 is a diagrammatic representation of an electrical wiring circuit in which my improved preselector device may be employed.

In the illustrated wiring diagram represented in Figure 11 of the drawings, the portion of the circuit appearing above the dotted line A represents the circuit of my novel control device, and the portion of the circuit below the dotted line A, represents the motor circuit for the apparatus to be controlled.

In the control circuit, the coils of the respective electromagnets are indicated at 86d and 87d, which are connected respectively in circuit with the snap action switches 98 and 96.

In the motor circuit, there is disclosed diagrammatically a normally open switch 160 adapted to be intermittently operated by a double lobed cam 161, for imparting interrupted or impulses of electrical current to either of the electromagnets. It is to be understood that the cam 161 is connected through suitable reduction gearing to the shunt wound motor 140, which includes a field 140a and an armature 140b. Connected in the motor circuit is a pair of limit switches 162 and 163, which as shown, are connected in opposite branches of the circuit of the armature 140b. The purpose of the limit switches 162 and 163 associated with the motor or the speed reducing mechanism associated therewith is to insure that the motor does not operate through an excessive range, so that the apparatus to be controlled may only be moved in a range which corresponds proportionally to the total range of adjustment of the control device, or, in other words, a range corresponding to approximately 180° of rotation of the knob assembly in either direction, as indicated by the graduated dial 46.

The source of energy for the circuit may be a conventional power supply line, or, as shown, in the form of a battery 165. It will be noted that one side of the battery is grounded and the other side is connected to the open terminal of the main switch 120.

*Operation*

In the operation of the control device, the knob assembly including the knob 50, the graduated dial 46, the member 43, together with the selector gear 64, are first pushed axially inwardly to disengage the selector gear from the indexing pin 66. If the main switch 120 has not previously been closed by moving the lever 124 to a forward position, such axial movement of the assembly as above described, will effect closing of the main switch. After the knob assembly is so axially adjusted, it may then be rotated in either direction from the zero or neutral starting position, an amount corresponding to a proportionate amount of movement to be imparted to the apparatus being controlled. Such axial movement of the adjusting means causes the pin 72 of the selector gear to interengage in a registered hole of the stepper gear 68, so that rotative adjustment of the adjusting means, also rotates the stepper gear simultaneously therewith a corresponding amount, Such axial movement of the adjusting means also actuates the snap switch 58, which in turn temporarily closes the auxiliary switch 60.

When the stepper gear is thus rotated, the cam 110 causes actuation of either of the dual sets of snap switches, that is, if the adjusting means affects rotation of the stepper gear in a clockwise direction, the switches 96 and 97 become actuated, and if the knob assembly is rotated in counter-clockwise direction, the switches 98 and 99 become actuated.

In Figure 6 of the drawings, the face of the control indicates a condition where the adjusting means has been pushed axially inwardly and rotated in clockwise direction an amount corresponding to five units of graduations of the graduated dial 46, and the knob assembly has not been released, or in any event, the control circuits have not been completed for causing actuation of the stepper mechanism. When the stepper mechanism is actuated, the index mark 37c of the position dial 37 will return to alignment with the index mark 38c on the main frame member, as seen in Figure 5. When pressure is relieved from the knob in the adjusted position, the knob and associated parts constituting the adjusting means is returned to its normal axially outward position, as seen in Figure 1 of the drawings, by the spring fingers 62, and in which position, the pin 72 of the selector gear has become disengaged from the stepper gear and the selector gear has become interlocked with the indexing pin 66, engaging in an aligned hole of the selector gear. The instant that the knob assembly assumes its outer position of adjustment, the snap switch 58 assumes a condition, as illustrated in the wiring diagram, and the motor 140 is operated and if safety conditions are proper, the stepper mechanism is immediately set in motion by the pulsations of current being supplied to the electromagnet 87, by the intermittently operated switch 160, by virtue of which said electromagnet actuates the stepper gear 68 in step-by-step fashion in a counter-clockwise direction as viewed from the face of the control, until the stepper gear returns to its zero starting position, at which time, as above indicated, the indicating mark 37c of the position dial becomes aligned with the indicating mark 38c on the main frame member.

When the stepper gear arrives at its zero starting position, the cam 110, which is rotatable therewith, acquires the position as indicated in dotted lines in Figure 9, at which time the cam lug 108 of the actuator at the right hand side in Figure 9 is permitted to engage the small diameter peripheral portion of the cam, and thus the two snap switches 96 and 97 are caused to assume an open circuit position as seen in the wiring diagram. In this position of the snap switches 96 and 97, the circuit connections to the armature of the motor are opened, so as to stop rotation of the motor, so that the apparatus being controlled will be arrested at a position in correspondence with the position of adjustment indicated by the graduations on the dial ring 46 in registration with the indicating mark 38c on the main frame member, and thus visually indicates the amount and direction of movement imparted to the apparatus being controlled within its permissible range of movement.

It will be noted that the motor circuit is such that if either of the limit switches 162 or 163 are caused to be actuated, the armature 140b becomes connected in a shunt circuit, and the circuit then functions as a dynamic brake and effects immediate stoppage of rotation of the armature and opening of the control circuit.

As long as the double lobe cam 161 driven by the motor becomes arrested with the switch 160 in open position, the apparatus being controlled and the control device are maintained in synchronized relationship to each other, so as to correctly indicate at all times the exact position of adjustment of the apparatus being controlled. If, however, the double lobe cam 161 becomes arrested in a position to maintain the switch 160 in closed position, there is likelihood that the apparatus being controlled and the control device would become out of step, or out of synchronized relationship to each other, because immediately upon completion of operative adjustment of the control device, the circuit to the electromagnet, depending upon the direction of rotative adjustment of the adjusting means, would immediately receive a pulsation of current, which would result in moving the stepper gear one tooth out of registration with respect to the adjustment of the adjusting means, so that the adjusting means would not correctly indicate the exact position of adjustment of the apparatus being controlled. If this condition were permitted to exist, the out-of-step relationship might build up to a considerable amount and render the control device grossly inaccurate. To avoid this difficulty, the relay 135 and auxiliary switch 60 are connected into the control and motor circuits in a manner so as to insure that the motor is first operated to dispose the cam 161 in a position to effect opening of the switch 160 without imparting a pulsation of current to either of the electromagnets. When the adjusting means is initially moved axially inwardly, the auxiliary switch 60 is closed, as well as the main switch 120, which results in energizing the relay 135 for completing a by-pass circuit through the switch 160 and thereby temporarily opening the circuit between the electromagnet to be energized and the switch 160, and the relay switch, due to a secondary by-pass circuit, omitting switch 60, remains in a position opposite to that shown in the wiring diagram, for a short period after the auxiliary switch 60 opens by the outward axial movement of the adjusting means, until the motor actuated switch 160 opens as a result of the motor 140 being driven. This condition attains because the snap switch 58 at that time assumes the position seen in the wiring diagram, to complete the motor circuit through the then closed snap switch 97. Just as soon, however, as the motor commences to rotate, it disposes the cam 161 in a position to effect opening of the switch 160, which instantly results in breaking the relay circuit, so that the relay switch assumes the position seen in the wiring diagram, thus completing the stepper operating circuit through the snap switch 96, which is adjusted to a position opposite that shown in the wiring diagram, and through the electromagnet 87, the relay switch and the contactor switch 160, so that the electromagnet may now receive pulsations of the electrical current in correspondence to the position of adjustment of the adjusting means. Thus synchronized relationship is maintained between the position of adjustment of the apparatus being controlled with the position of adjustment of the adjusting means.

It will also be apparent that the novel electrical safety feature including the relay and switch 60 insures such synchronized relationship, even if the adjusting means is manipulated during the time that the stepper gear is in process of being stepped to its zero starting position, because when the adjusting means is pushed axially inwardly, the switch 58 is moved to a position opposite to that seen in the wiring diagram and thus breaks the circuit to the armature of the motor. Therefore, the stepper gear may under such conditions be moved in either direction by the readjustment of the adjusting means, while at the same time assuring proper and exact synchronized relationship between the apparatus being controlled and the position of adjustment of the adjusting means.

It will thus be apparent that the apparatus to be controlled may be adjusted in either direction of its permissible range of movement, and it is not essential in order to effect readjustment that the adjusting means be returned to a neutral or zero starting position, as any intermediate permissible amount of movement or adjustment may be attained. As for example, if the control device is used in connection with a control of a trim tab of an airplane, wherein the trim tab is mounted for pivotal movement, it may be desired to adjust the trim tab in an upward direction, say for example 5°, as indicated by the position of adjustment seen in Figure 6 of the drawings. To accomplish this, the adjusting means including the knob 50 and associated parts are first moved axially inwardly as seen in Figure 3, and then the assembly is rotated clockwise until the graduation "5" on the white surface area (herein shown by stippling) is disposed in registration with the index mark 38c on the main frame member, and upon release of the knob assembly, said assembly moves axially outwardly to the position seen in Figure 1 of the drawings, and the control unit then operates in a step-by-step fashion, corresponding to the rate of motion imparted by the impulses produced by the motor driven lobe cam 161, to dispose the stepper gear at its zero starting position. Simultaneously therewith, said motor through the medium of suitable motion transmitting means moves the trim tab to cause it to assume a position in the amount of 5° in an upwardly disposed relation to a normal or neutral position of adjustment.

Now if it is desired that the trim tab be moved in a downwardly direction, for example 6° below its normal or neutral position of adjustment, the main operating knob 50 is again pushed inwardly and turned counter-clockwise, until the graduation "6" on the downward side of the dial 46 is registered with the index mark 38c. As soon as the pressure is again released from the knob 50, the assembly moves axially outwardly for completing the electrical circuit as above described, so that the control device is stepped in correspondence with movement of the trim tab, until the trim tab acquires the position of 6° downwardly with respect to its normal position, at which time the stepper gear arrives at its neutral or zero position. The position disc 37, due to its rigid connection with the stepper gear, moves simultaneously therewith and when said gear is in its neutral or zero starting position, the index mark 37c of said disc is disposed in registration with the index mark 38c on the main frame member. It will therefore be apparent that the graduated dial will at all times indicate the exact position of adjustment of the trim tab or other apparatus being controlled, and this is true, even during the interval that the trim tab is being moved because the index mark 37c of the position disc will at all times indicate the exact position of the stepper gear, which will correspond to the position of adjustment which the trim tab acquires at that particular instant.

It is to be understood that the set of snap switches 98 and 99 and electromagnet 86 function in identical relationship to the switches 96 and 97 and magnet 87 during the counter-clockwise adjustment of the adjusting means, and the circuit otherwise functions as above described.

While I have shown the cam 161 of a form to effect closing of the switch 160 twice during each revolution thereof, any other suitable form of cam may be employed for effecting closing of the switch a desired number of times during each rotation thereof, it being understood, of course, that the driving mechanism to be associated with the apparatus to be moved or adjusted must be correspondingly proportioned, so as to maintain exact correspondence of movement of said apparatus with the stepper mechanism.

It is to be understood that the terms "adjustment means" and "selective adjustment means" define the knob and dial assembly and all parts associated and movable therewith as a unit.

Although I have herein shown and described a preferred embodiment of my invention, manifestly it is capable of modification and re-arrangement of parts without departing from the spirit and scope thereof. I do not, therefore, wish to be understood as limiting this invention to the precise form herein disclosed, except as it may be so limited by the appended claims.

I claim as my invention:

1. A control device of the character described, comprising a mounting frame; a two direction selective adjustment means carried on the forward end of the frame, comprising a rotatable knob assembly, means normally locking the assembly against rotation in the frame and disengageable upon limited axial movement of the assembly in said frame, a main switch mounted on the frame and connected in an electrical control circuit; and an axially shiftable shaft supported on the frame with one end disposed in operative engagement with the switch, said shaft being adapted to assume either of two axial positions of adjustment and adapted in one position to have its other end positioned to be engaged by the knob assembly, incident to such limited axial movement of the latter, for axially shifting the shaft to its other position of adjustment for effecting actuation of said switch.

2. A control device of the character described, comprising a mounting frame; a two direction selective adjustment means carried on the forward end of the frame, comprising a rotatable knob assembly, means normally locking the assembly against rotation in the frame and disengageable upon limited axial movement of the assembly in said frame, a main switch mounted on the frame and connected in an electrical control circuit; an axially shiftable shaft supported on the frame with one end disposed in operative engagement with the switch, said shaft being adapted to assume either of two axial positions of adjustment and adapted in one position to have its other end positioned to be engaged by the knob assembly, incident to such limited axial movement of the latter, for axially shifting the shaft to its other position of adjustment for effecting actuation of said switch; and detent means for releasably securing said shaft at either of its axial positions of adjustment.

3. A control device of the character described, comprising a mounting frame; a two direction selective adjustment means carried on the forward end of the frame, comprising a rotatable knob assembly, means normally locking the assembly against rotation in the frame and disengageable upon limited axial movement of the assembly in said frame, a main switch mounted on the frame and connected in an electrical control circuit; an axially shiftable shaft supported on the frame with one end disposed in operative engagement with the switch, said shaft being adapted to assume either of two axial positions of adjustment and adapted in one position to have its other end positioned to be engaged by the knob assembly, incident to such limited axial movement of the latter, for axially shifting the shaft to its other position of adjustment for effecting actuation of said switch; detent means for releasably securing said shaft at either of its axial positions of adjustment; and separate means supported on the frame and interconnected with said shaft for moving the latter to either of its two positions of axial adjustment.

4. A control device of the character described, comprising a mounting frame; a two direction selective adjustment means carried on the forward end of the frame, comprising a rotatable knob assembly, means normally locking the assembly against rotation in the frame and disengageable upon limited axial movement of the assembly in said frame, a main switch mounted on the frame and connected in an electrical control circuit; an axially shiftable shaft supported on the frame with one end disposed in operative engagement with the switch, said shaft being adapted to assume either of two axial positions of adjustment and adapted in one position to have its other end positioned to be engaged by the knob assembly, incident to such limited axial movement of the latter, for axially shifting the shaft to its other position of adjustment for effecting actuation of said switch; detent means for releasably securing said shaft at either of its axial positions of adjustment; a lever supported on the forward end of the frame and operably connected to said shaft for moving the latter to either of its two positions of axial adjustment; and guard means on the frame disposed on opposite sides of the lever and extending in the general direction of movement of the lever.

5. A control of the character described for controlling the movement and positioning of electric power operated apparatus within a predetermined range of movement, comprising a mounting frame; a two direction stepper mechanism mounted on the frame and adapted to be operated by pulsations of electric current, and comprising a rotary stepper gear normally disposed in a zero starting position; a two direction selective adjustment means carried on the frame and adapted to be rotatably moved from a zero starting position, in either direction, to a position corresponding to a position to which said apparatus is to be moved, within its range of movement; said adjusting means and gear including disengageable interconnections to cause movement of said gear incident to adjustment of said adjusting means; stop means carried on the frame for precluding rotation of said gear and adjusting means during adjustment thereof in either direction, through a range exceeding 180° from said zero starting position; and means on the frame, including means operably connected to said gear, and rendered operable incident to completion of adjustment of said adjusting means for completing interconnected electric control circuits for rotating the stepper gear to its zero starting position and simultaneously cause movement of said apparatus to a position, within its range of movement, corresponding to said adjustment of the selective adjustment means.

6. A control of the character described for controlling the movement and positioning of electric power operated apparatus within a predetermined range of movement, comprising a mounting frame; a two direction stepper mechanism mounted on the frame and adapted to be operated by pulsations of electric current, and comprising a rotary stepper gear normally disposed in a zero starting position; a two direction selective adjustment means carried on the frame and adapted to be rotatably moved from a zero starting position, in either direction, to a position corresponding to a position to which said apparatus is to be moved, within its range of movement; said adjusting means and gear including disengageable interconnections to cause movement of said gear incident to adjustment of said adjusting means; stop means carried on the frame for precluding rotation of said gear and adjusting means, during adjustment thereof in either direction, through a range exceeding 180° from said zero starting position, said stop means including a rotatable member having a pair of oppositely disposed shoulders, spaced apart in an operative range of travel of less than 180°, and a pair of spring pressed dogs engaging opposite sides of said member for cooperative engagement respectively with the shoulder on the opposite side of said member; and means on the frame, including means operably connected to said gear, and rendered operable incident to completion of adjustment of said adjusting means for completing interconnected electric control circuits for rotating the stepper gear to its zero starting position and simultaneously cause movement of said apparatus to a position, within its range of movement, corresponding to said adjustment of the selective adjustment means.

7. A control of the character described for controlling the movement and positioning of electric power apparatus within a predetermined range of movement, comprising a mounting frame, a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; cam means under control of said gear and operable, upon completion of adjustment of said adjustment means for effecting closure of a corresponding pair of switches of one said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment; and stop means carried on the frame for precluding rotation of said gear and adjusting means, during adjustment thereof in either direction, through a range exceeding 180° from said zero starting position.

8. A control of the character described for controlling the movement and positioning of electric power operated apparatus within a predetermined range of movement, comprising a mounting frame; a two direction stepper mechanism carried on the frame and adapted to be selectively operated by pulsations of electric current, and comprising a rotary stepper gear normally disposed at a zero starting position; a two direction selective adjustment means carried on the frame, comprising a rotatable knob assembly and a selector gear mounted coaxially with the stepper gear, and index means associated with the knob assembly and frame, said knob assembly and selector gear being axially shiftable toward the stepper gear and rotatable in either direction, in such shifted position, from a zero starting position to a selected position corresponding to a position to be assumed by said apparatus within its range of movement; driving means for interconnecting said gears in such shifted position to cause rotation of the stepper gear with the selector gear to a preselected position of adjustment, said means comprising a circular series of holes in the stepper gear, corresponding in number and angular spacing to the teeth of said stepper gear, and a pin on the adjacent face of the selector gear adapted upon such axial movement for engaging in an aligned hole of the stepper gear; and spring means positioned to yieldingly urge the selective adjustment means to its outer position for disengaging said gears.

9. A control of the character described for controlling the movement and positioning of electric power operated apparatus within a predetermined range of movement, comprising a mounting frame; a two direction stepper mechanism carried on the frame and adapted to be selectively operated by pulsations of electric current, and comprising a rotary stepper gear normally disposed at a zero starting position; a two direction selective adjustment means carried on the frame, comprising a rotatable knob assembly and a selector gear mounted coaxially with the stepper gear and index means associated with the knob assembly and frame, said knob assembly and selector gear being axially shiftable toward the stepper gear and rotatable in either direction, in such shifted position, from a zero starting position to a selected position corresponding to a position to be assumed by said apparatus within its range of movement; said stepper and selector gears being of similar form and each being provided with a corresponding circular series of holes of the same number and same angular spacing as the teeth thereof; a pin disposed in one hole of the selector gear and adapted upon axial movement of the latter to engage in a corresponding aligned hole of the stepper gear for rotating the stepper gear with the selector gear; a pin on the frame normally engageable in a hole of the selector gear to preclude rotation of the selector gear and knob assembly and disengageable therefrom upon axial movement of the selector gear and knob assembly; separate spring detent means engaging the periphery of said gears for releasably maintaining each of said gears in a rotative position of adjustment; and spring means for yieldingly urging the selective adjustment means to its outer normal position for disengaging said gears.

10. A control of the character described for controlling the movement and positioning of electric power operated apparatus within a predetermined range of movement, comprising a mounting frame; a two direction stepper mechanism carried on the frame and adapted to be selectively operated by pulsations of electric current, and comprising a rotary stepper gear normally disposed at a zero starting position; a two direction selective adjustment means carried on the frame, comprising a rotatable knob assembly and a selector gear mounted coaxially with the stepper gear, and index means associated with the knob assembly and frame, said knob assembly and selector gear being axially shiftable toward the stepper gear and rotatable in either direction in such shifted position, from a zero starting position to a selected position corresponding to a position to be assumed by said apparatus within its range of movement; said stepper and selector gears being of similar form and each being provided with a corresponding circular series of holes of the same number and same angular spacing as the teeth thereof; a pin disposed in one hole of the selector gear and adapted upon axial movement of the latter to engage in a corresponding aligned hole of the stepper gear for rotating the stepper gear with the selector gear; a pin on the frame normally engageable in a hole of the selector gear to preclude rotation of the selector gear and knob assembly and disengageable therefrom upon axial movement of the selector gear and knob assembly, the teeth of each of said gears being pointed and the adjacent edges of said teeth being formed to produce wide angular notches; separate spring detent means engaging the notches of said gears for releasably maintaining each of said gears in a rotative position of adjustment; and spring means for yieldingly urging the selective adjustment means to its outer normal position for disengaging said gears.

11. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining correspondence in positioning of said apparatus with said preselected adjustment of the adjustment means.

12. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet, and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last mentioned control means comprising a relay, and a normally open switch connected in circuit with the coil of the relay and adapted to be closed incident to adjusting movement of the adjustment means for maintaining correspondence in movement of the stepper gear and the apparatus being controlled.

13. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last-mentioned means comprising a relay, a normally open switch connected in circuit with the coil of the relay and adapted to be closed incident to adjusting movement of the adjusting means for temporarily opening the circuit including said magnets for maintaining correspondence in movement of the stepper gear and the apparatus being controlled, and a switch connected in said branch circuits for the power operated apparatus and adapted to open said branch circuits incident to adjusting movement of said adjusting means.

14. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last-mentioned means comprising a relay, a normally open switch connected in circuit with the coil of the relay and adapted to be closed incident to adjusting movement of the adjusting means for temporarily opening the circuit including said magnets for maintaining correspondence in movement of the stepper gear and the apparatus being controlled, and a switch connected in said branch circuits for the power operated apparatus and adapted to open said branch circuits incident to adjusting movement of said adjusting means, said last mentioned switch and the switch connected in circuit with said relay being positioned relatively to each other for causing actuation of one incident to actuation by the other.

THEDORE OBSZARNY.